United States Patent
Allen et al.

(10) Patent No.: US 10,146,816 B2
(45) Date of Patent: Dec. 4, 2018

(54) TECHNOLOGY FOR PROVIDING CONTENT OF A PUBLISH-SUBSCRIBE TOPIC TREE

(71) Applicant: International Business Machines Corporation, Armonk, NY (US)

(72) Inventors: Joseph H. Allen, Belmont, MA (US); David J. Hoeweler, Cambridge, MA (US); Gari R. Singh, Wilmington, MA (US); Meeta Yadav, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 14/512,110

(22) Filed: Oct. 10, 2014

(65) Prior Publication Data

US 2016/0103865 A1 Apr. 14, 2016

(51) Int. Cl.
*G06F 17/30* (2006.01)
*H04L 12/58* (2006.01)

(52) U.S. Cl.
CPC .... *G06F 17/30327* (2013.01); *G06F 17/3033* (2013.01); *G06F 17/30424* (2013.01); *H04L 51/22* (2013.01); *H04L 51/28* (2013.01)

(58) Field of Classification Search
CPC ................................................ G06F 17/30327
USPC .......................................................... 707/747
See application file for complete search history.

(56) References Cited

U.S. PATENT DOCUMENTS

| | | | |
|---|---|---|---|
| 6,279,007 B1* | 8/2001 | Uppala | G06F 17/30961 |
| 2005/0055437 A1* | 3/2005 | Burckart | G06F 17/30887 |
| | | | 709/224 |
| 2005/0131916 A1* | 6/2005 | Banatwala | G06F 17/30595 |
| 2011/0289163 A1* | 11/2011 | Edwards | G06F 9/542 |
| | | | 709/206 |
| 2012/0166440 A1 | 6/2012 | Shmueli et al. | |
| 2012/0233268 A1* | 9/2012 | Bedi | H04L 12/58 |
| | | | 709/206 |

OTHER PUBLICATIONS

List of IBM Patents or Patent Applications Treated as Related, Mar. 21, 2015.
Joseph H. Allen, et al. "Technology for Providing Content of a Publish-Subscribe Topic Tree," U.S. Appl. No. 14/699,777, filed Apr. 29, 2015.
List of IBM Patents or Patent Applications Treated as Related, May 3, 2015.

* cited by examiner

*Primary Examiner* — Kimberly L Wilson
(74) *Attorney, Agent, or Firm* — Anthony V. S. England; Michael O'Keefe

(57) ABSTRACT

Content of a publish-subscribe topic tree is provided. This includes receiving a path for a requested topic. The path specifies topics leading from a highest to a lowest level topic in the path. Content in the topic tree is retrieved for matching topics that match the lowest level topic in the path independently of whether the matching topics are on the path in the tree.

11 Claims, 6 Drawing Sheets

| NODE IDENT. | MEM LOC. | TOPIC NAME 420 | LINKS TO CHILD LOCATIONS 440 | CONTENT 430 |
|---|---|---|---|---|
| 001 | 401 | SPORT | 402,403,404 | XXXXX... |
| 011 | 402 | GOLF | | XXXXX... |
| 012 | 403 | SOCCER | 405,406,407 | XXXXX... |
| 013 | 404 | TENNIS | | XXXXX... |
| 121 | 405 | ARSENAL | | XXXXX... |
| 122 | 406 | CHELSEA | | XXXXX... |
| 123 | 407 | MANCH. UNITED | | XXXXX... |

LINKED LIST 400

TECHNOLOGY FOR PROVIDING CONTENT OF A PUBLISH-SUBSCRIBE TOPIC TREE

BACKGROUND

In publish-subscribe software architecture, producers categorize their messages according to topics. They may publish messages by topic without regard to who will receive, i.e., without sending messages directly to specific recipients. Correspondingly, subscribers select categories of content to receive without receiving the published content, i.e., one or more messages, directly from publishers. This publish-subscribe arrangement delivers messages from publishers to interested subscribers by routing the messages based on topic trees.

SUMMARY

A method for providing content of a publish-subscribe topic tree includes receiving a path for a requested topic. The path specifies topics leading from a highest to a lowest level topic in the path. The method includes retrieving content in the topic tree for matching topics that match the lowest level topic in the path independently of whether the matching topics are on the path in the tree.

In another aspect, the method includes finding, in a hash table, topic tree node identifiers for topics specified in the path. Also, content retrieved for one of the matching topics is sent for a requester, wherein the sending is in response to an analysis of the topic tree node identifiers found in the hash table.

In another aspect, the retrieving of the content in the tree for matching topics is performed by a computer processor during at least one processing cycle when the finding of the topic tree node identifiers in the hash table is performed.

In another aspect, the content of at least one of the matching topics is retrieved during at least one processing cycle when at least one other one of the matching topics is retrieved.

In another aspect, the method includes adding node identifiers to nodes of the topic tree.

In another aspect, the adding of node identifiers to nodes of the topic tree is performed before the retrieving of the content in the topic tree for matching topics.

In another aspect, the method includes creating the hash table, which includes writing topic names and the node identifiers for respective nodes of the topic tree.

System and computer program products relating to the above-summarized methods are also described and claimed herein.

BRIEF DESCRIPTION OF THE DRAWINGS

The above described aspects of the present invention and others, including objects, forms, features and advantages, will become more apparent from the following detailed description of illustrative embodiments thereof, which is to be read in connection with the accompanying drawings. The drawings are not to scale and are, together with the detailed description, for clarity in facilitating the understanding of persons skilled in the related art. In the drawings.

DETAILED DESCRIPTION

Detailed embodiments of the present invention are disclosed herein to illustrate claimed structures and methods. This invention may, however, be embodied in many different forms and should not be construed as limited to the exemplary embodiments disclosed herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Figure 1:
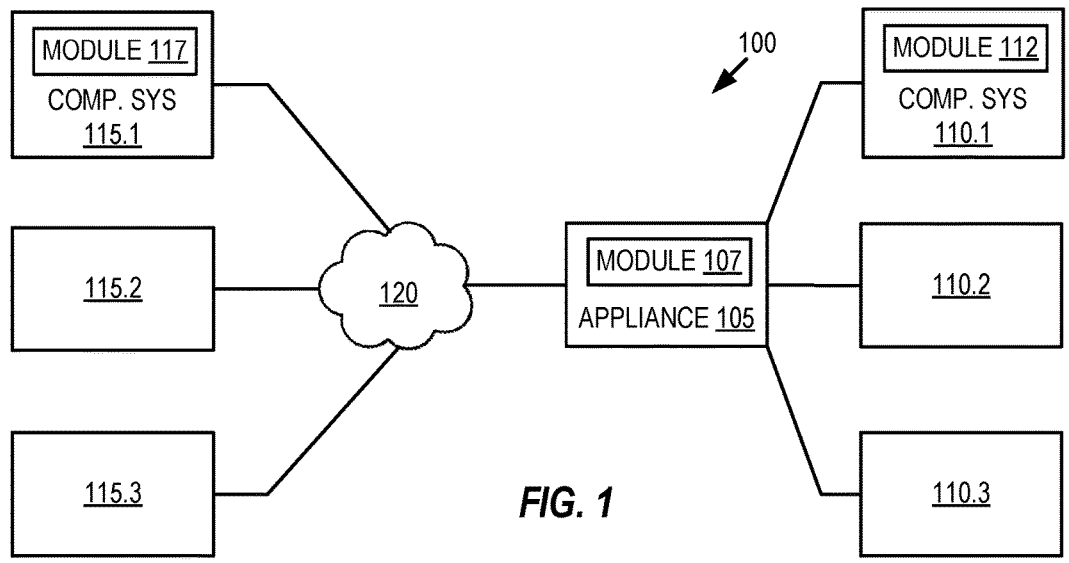
FIG. 1 illustrates a networked computer environment, according to embodiments of the present invention.

FIG. 1 illustrates an example computing environment 100, according to embodiments of the present invention. As shown, computing environment 100 includes a computer appliance 105 connected to computer systems 110.1, 110.2, etc. via network 120, which may be public or private, to computer systems 115.1, 115.2, etc. (It should be understood that appliance 105 may also be connected to systems 110 via a public or private network.) Appliance 105 and systems 110 and 115 include various modules 107, 112 and 117, respectively, which may be program or hardware modules configured to perform tasks for their respective devices.

Appliance 105 may provide machine-to-machine, publish-subscribe messaging, according to embodiments of the present invention, wherein messaging appliance 105 may capture information about events in topic trees via communication with network 120 connected devices 115, which may include sensors, and may stream the event information to machines 110 that subscribe to the information for performing data analysis. The events may be large in number and the data analysis may be large-scale, according to embodiments of the present invention. Accordingly, appliance 105 may be referred to as an "Internet scale messaging" appliance.

Alternatively, computer systems 110 may serve systems 115 as servers to clients, according to embodiments of the present invention, wherein servers 110 provide access for clients 115 to applications 112 via appliance 105 and network 120. In this context, computer appliance 105 may be referred to as a "gateway" appliance, which may, for example, provide various security capabilities. Accordingly, it should be understood that publish-subscribe messaging as described herein may be carried out via topic trees residing in memory included in, or at least accessible to, any or all of appliance 105, servers 110 and clients 115.

Figure 2:
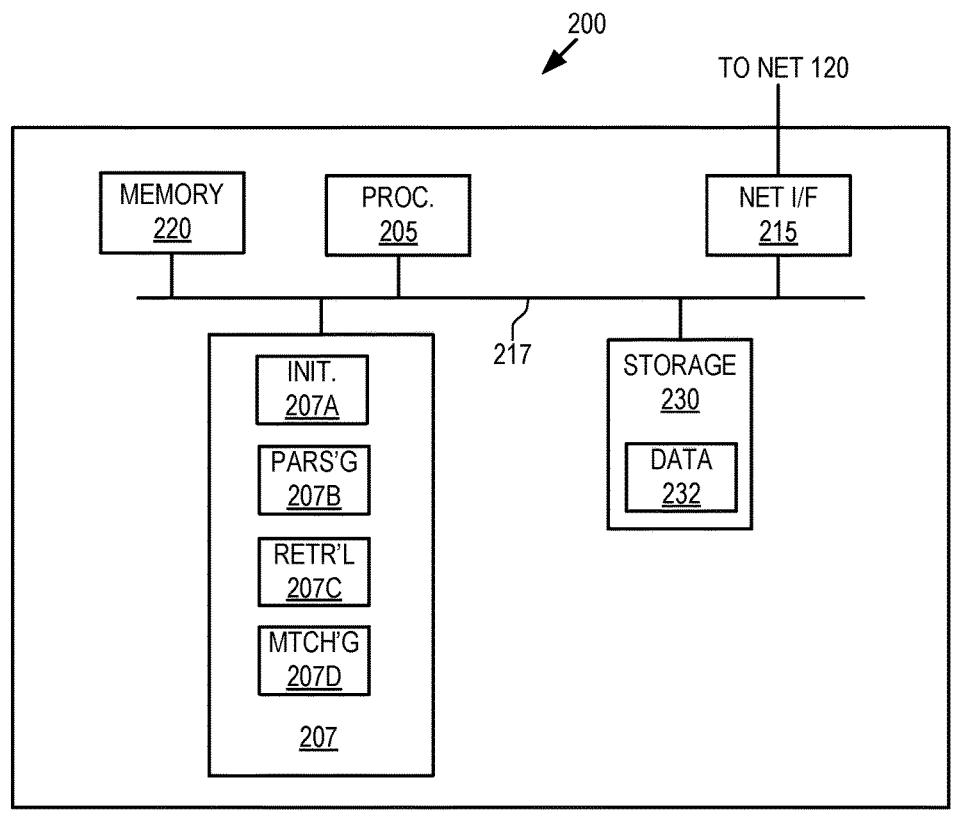
FIG. 2 is a block diagram of devices shown in FIG. 1, according to embodiments of the present invention.

FIG. 2 illustrates a system 200, which may be applied as any or all of appliance 105 and computer systems 110 and 115, according to embodiments of the present invention. As shown, system 200 includes a central processing unit (CPU) 205, a network interface 215, an interconnect (i.e., bus) 217, a memory 220, and storage 230.

CPU 205 may retrieve and execute programming instructions stored in memory 220. Similarly, CPU 205 may retrieve and store application data residing in memory 220. Interconnect 217 may facilitate transmission, such as of programming instructions and application data, among CPU 205, storage 230, network interface 215, and memory 220. CPU 205 is included to be representative of a single CPU, multiple CPUs, a single CPU having multiple processing cores, and the like. Additionally, memory 220 is included to be representative of a random access memory. As shown, memory 220 includes program modules 207, which includes initialization module 207A, parsing module 207B, retrieval module 207C and matching module 207D, according to embodiments of the present invention. However, it should be understood that one or more of modules 207 may be implemented by other hardware and may be firmware.

Storage 230 may be a disk drive storage device, for example. Although shown as a single unit, storage 230 may be a combination of fixed and/or removable storage devices, such as fixed disc drives, floppy disc drives, tape drives, removable memory cards or optical storage, network attached storage (NAS), or a storage area-network (SAN). As shown, storage 230 includes program code and data 232 for run time execution in memory 220, such by program modules 207, wherein the data may include one or more topic trees.

Figures 3, 4:
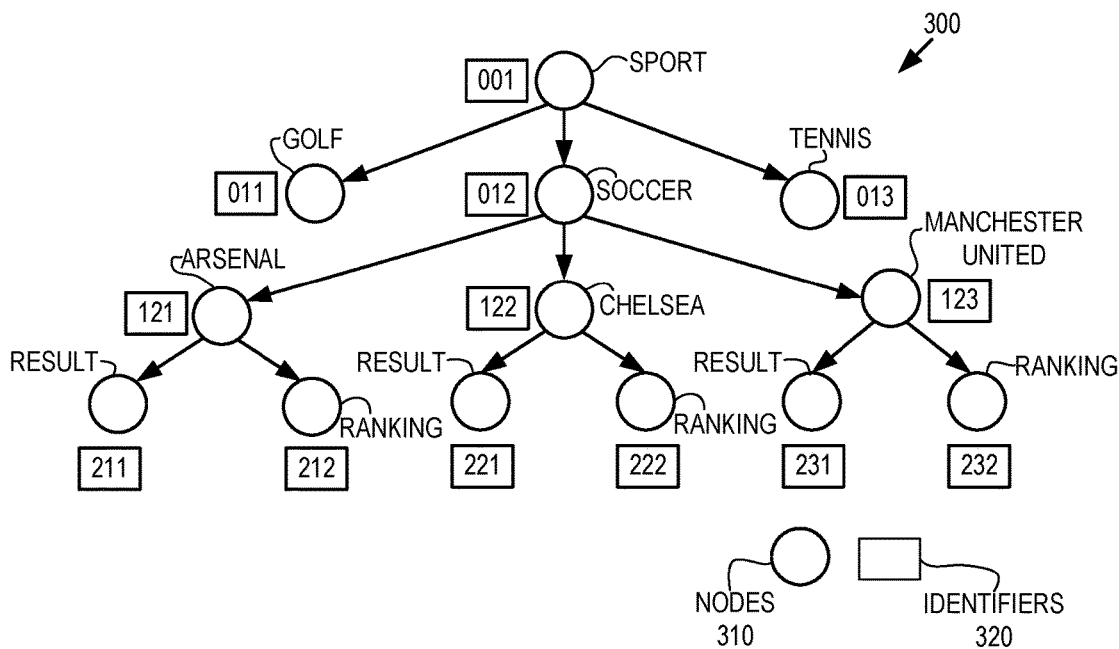
FIG. 3 illustrates a topic tree 300, according to embodiments of the present invention.
FIG. 4 illustrates a linked list 400 for topic tree 300 of FIG. 3, according to embodiments of the present invention.

FIG. 3 illustrates a topic tree 300. This is a small tree 300 used as an example to illustrate certain aspects of embodiments of the present invention. It should be understood that in actual practice, a publish-subscribe tree may be much bigger.

A popular way to structure topic trees such as tree 300, wherein topics are organized hierarchically as nodes 310, is by linked lists, for example. FIG. 4 illustrates a linked list 400 for topic tree 300 of FIG. 3, according to embodiments of the present invention, wherein each row of linked list 400 represents a set of memory locations for a particular topic. Herein, topic tree 300, which is graphically depicted in FIG. 3 and more literally depicted as linked list 400 in FIG. 4, will be referred to interchangeably as tree 300 and linked list 400.

FIG. 4 shows a memory location at the start of each row of linked list 400, such as location "401" for the first row. This illustrates that the starting memory location for the topic of the first row in linked list 400 is at memory location 401. As understood by a person of ordinary skill in the art, the memory location is addressable by a compute processor, such as processor 205 in FIG. 2, according to a different address than merely memory address "401," but the addresses shown in FIG. 400 serve to illustrate actual memory addresses. Linked list 400 includes not only names 420 of topics, but also associated subscription content 430, e.g., one or more messages, for each topic. As in a typical data structure of this type, in linked list 400 a parent topic points to that of its child topics by links 440 pointing to memory locations of the respective children. For example, the parent topic of the first row in list 400, which is named "sport," points to its child topics by links pointing to memory locations 402, 403 and 404 of its respective children topics. Likewise, each child topic points by links to its own children, such as the topic named "soccer" starting in memory location 403, pointing by links to children starting in memory locations 405, 406 and 407. As content is added and removed in a topic tree, the relationships of given memory locations tend to change with respect to one another. Linked list 400 data structure accounts for such changes by adjustment of memory pointers in the links. Correspondingly, topics are conventionally accessed in memory according to a sequence, wherein links in the tree's linked list data structure are followed from the memory location of the highest topic in the request to the next topic down in the path hierarchy, and so on, until reaching the requested topic.

According to the above described linked list 400, a subscriber addresses content for a particular topic by a request listing a path to the requested topic, where the path starts with the highest topic in the hierarchy. For example, the text string "sport/soccer/arsenal/ranking," indicates the particular requested "ranking" topic by specifying a series of nodes leading from the highest node in the tree, "sport," down through progressively lower ranked, connected nodes and ultimately to the requested node, "ranking." This sequence of topics defines a direct path in the tree, from parent (sport) to child (soccer), parent (soccer) to child (arsenal), etc., where the path leads to and includes the requested node.

To access a topic in this way typically requires a processing cycle for each topic in the specified path to a requested topic, which is at a leaf node of the tree. This makes throughput and latency dependent on the topic tree depth. With the explosion of information generated by mobile devices and smart sensors, topic trees are growing deeper, bigger and more complex. Due to traversing longer sequences of topics in a tree, performance tends to suffer.

Figure 6A:
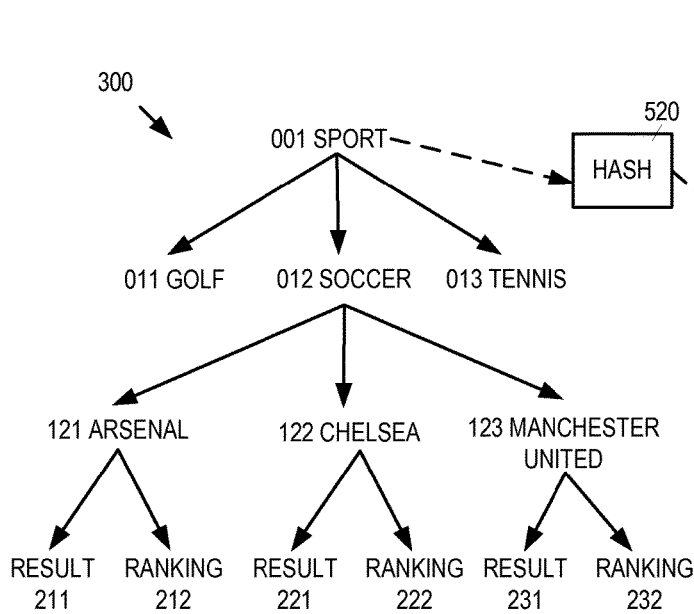
FIG. 6A illustrates a hash table resulting from a topic tree, according to embodiments of the present invention.

Embodiments of the present invention provide higher throughput, lower latency technology for publish/subscribe topic matching, wherein more than one topic may be processed in a given processing cycle. In one aspect, according to embodiments of the present invention, an initialization processing module 207A (FIG. 2) modifies an existing topic tree 300 data structure to add a respective node identifier 320 to each node 310, as shown, and creates a hash table 600 as shown in FIG. 6A, in order to maintain an easily accessible, persistent record of the node identifiers, wherein each identifier distinguishes its respective node 310 from other nodes 310 in tree 300 and also indicates its parent node 310. This created data structure, including hash table 600 and linked list 400 with added identifiers, tends to make throughput and latency more independent of the depth of tree 300 by processes disclosed herein for accessing the data therein.

As previously described, initialization processing module 207A modifies an existing topic tree data structure 400 to add node identifiers. More specifically, module 207A creates node identifiers according to a particular procedure in embodiments of the present invention, wherein module 207A assigns the top node in tree 300 a node identifier, wherein the two left-most digits signify that there is no higher level node, i.e., no parent, and the right-most digit signifies that the top node is the first node in a particular level of the hierarchy. Thus, in tree 300, module 207A generates the digits "00" to signify that there is no higher node and "1," of course, to signify a first node at this level, so that module 207A assigns the top node, which is the "sport" topic," node "001."

For each child node of a parent node in tree 300, module 207A assigns the two right-most digits of the parent's identifier as the two left-most digits of the child's identifier and consecutively numbers each child, assigning each child's own consecutive number as its right-most node identifier digit. Thus, for example, in tree 300, for the first child node ("golf") of the top node, module 207A assigns node identifier "011," i.e., "01" for the two left-most digits, which are from the two right-most digits of the parent ("sport") identifier "001," and "1" for the right-most digit, since golf is the first child of the parent, where first, second, etc. proceed from left to right in FIG. 3. For the second child node ("soccer") of the top node, module 207A assigns node identifier "012." For the third child node ("tennis") of the top node, module 207A assigns node identifier "013."

Module 207A continues through the nodes and assigns node identifiers in the same fashion until it has assigned identifiers to all nodes. It should be understood, of course, that in larger trees the node identification procedure may use more digits, but according to the same general logic.

Figure 5:
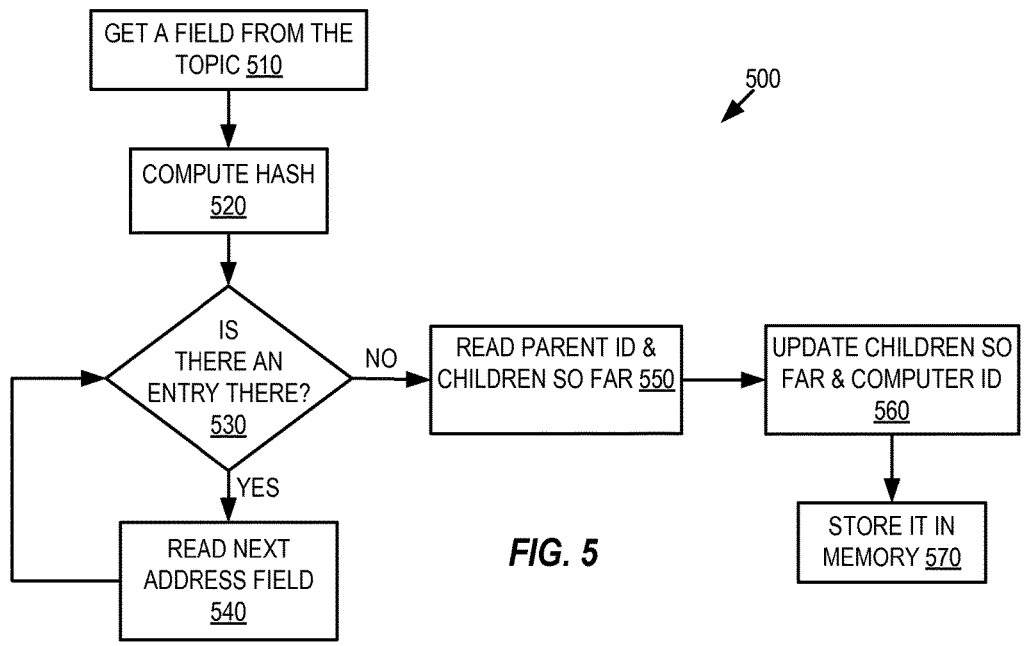
FIG. 5 illustrates a process for assigning node identifiers, according to embodiments of the present invention.

FIG. 5 illustrates more generally the above described procedure for assigning node identifiers, according to embodiments of the present invention. In the illustrated process 500, a processing module gets 510 a topic (which may be also known as a "field") from a topic tree, such as topic tree 300 of FIG. 3, for example. Initialization module 207A may generally perform the actions of process 500, and may get a topic by calling one or more methods in parsing module 207B, for example. At 520, process 500 computes an address by hashing the topic. Using the address, process 500 looks at the location indicated by the address in order to determine 530 if there is an entry there. This is because when there is more than one instance of a topic of the same name, the hash address computed for a second instance of the topic (and any additional instances) will collide with the hash address computed for the first instance.

If process 500 determines 530 there is NOT already a topic at the hash computed address, process 500 reads the parent identifier and the number of children so far for the parent of the current topic at 550. Responsive to obtaining this, process 500 updates the number of children so far, increasing it by one if necessary, and computes 560 an identifier for the current topic. Process 500 stores 570 this information in memory and repeats for the next field.

If, at 530, process 500 determines there is already a topic at the hash computed address, process 500 responsively reads 540 the "next address" field at the hash computed address and loops back to determining action 530. If reading 540 indicates there is an entry at the "next address" field, process 500 goes to the indicated address and reads the "next address" field at that entry. This is repeated until the last previous entry of an instance of the topic is found, as indicated by finding no entry in the "next address" field. When process 500 finds such, process 500 reads the parent identifier and the number of children so far for the parent of the current topic at 550. Responsive to obtaining this, process 500 updates the number of children so far, increasing it by one if necessary, and computes 560 an identifier for the current topic. Process 500 stores 570 this information at the next available storage location for the new entry of this topic and stores the address of that location in the "next address" field of the previous entry for the same topic name. Then process 500 repeats for the next field.

Figure 6B:
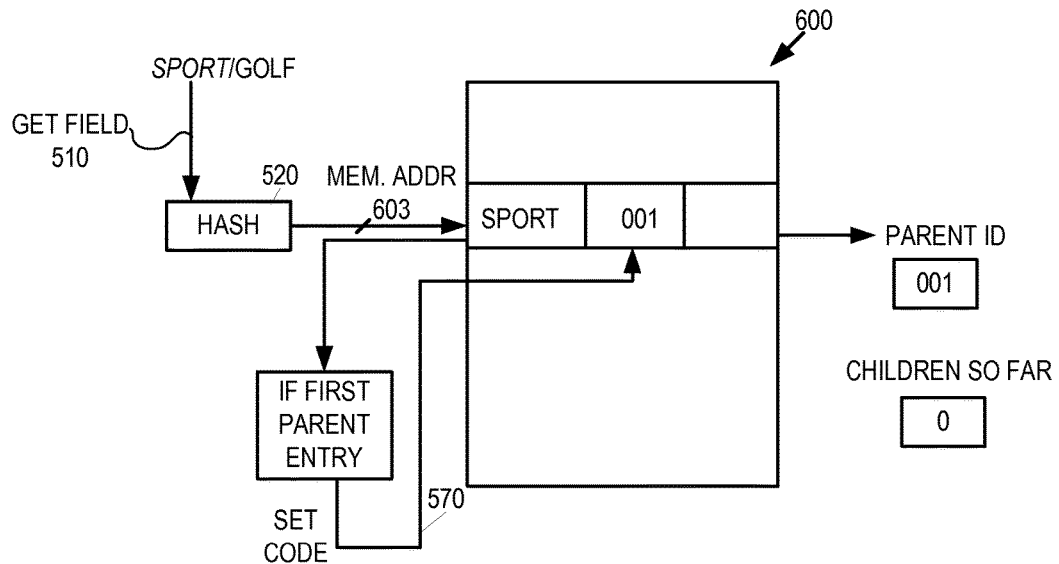
FIG. 6B illustrates creating an entry for the hash table based on a node of the topic tree, according to embodiments of the present invention.

FIGS. 6A-6B illustrate more specifically, in an example, creation of node identifiers and hash table 600, such as by initialization process 207A, according to embodiments of the present invention.

FIG. 6A shows the entire topic tree 300 of FIG. 3 and a resulting hash table 600, according to embodiments of the present invention. It may be seen that up each topic is stored in its own respective memory address 601 through 613, as computed by hash process 520, together with its node identifier. As previously mentioned, a "next address" field is also included for those topics having more than one instance of the same name. In the example shown, the "result" topic name is stored at memory addresses 601, 604 and 608, so the "next address" field for the first instance at memory address 601 points to the second instance at 604, the "next address" field for the second instance at memory address 604 points to the third instance at 608, and the "next address" field for the third instance at memory address 608 is empty, since this is the last instance. Likewise, the "ranking" topic name is stored at memory addresses 605, 610 and 613, so the "next address" field for the first instance at memory address 605 points to the second instance at 610, the "next address" field for the second instance at memory address 610 points to the third instance at 613, and the "next address" field for the third instance at memory address 613 is empty, since this is the last instance.

FIG. 6B shows getting 510 the first node, that is, "sport," of tree 300 and hashing it 520, which yields a computed memory address 603, which does not already have an entry there. Since this is the first parent entry, i.e., node, for tree 300, initialization code directs the process to set an initial node identifier having the value "001" for the topic and process 500 stores 570 the topic name, "Sport," and identifier, "001."

Figure 6C:
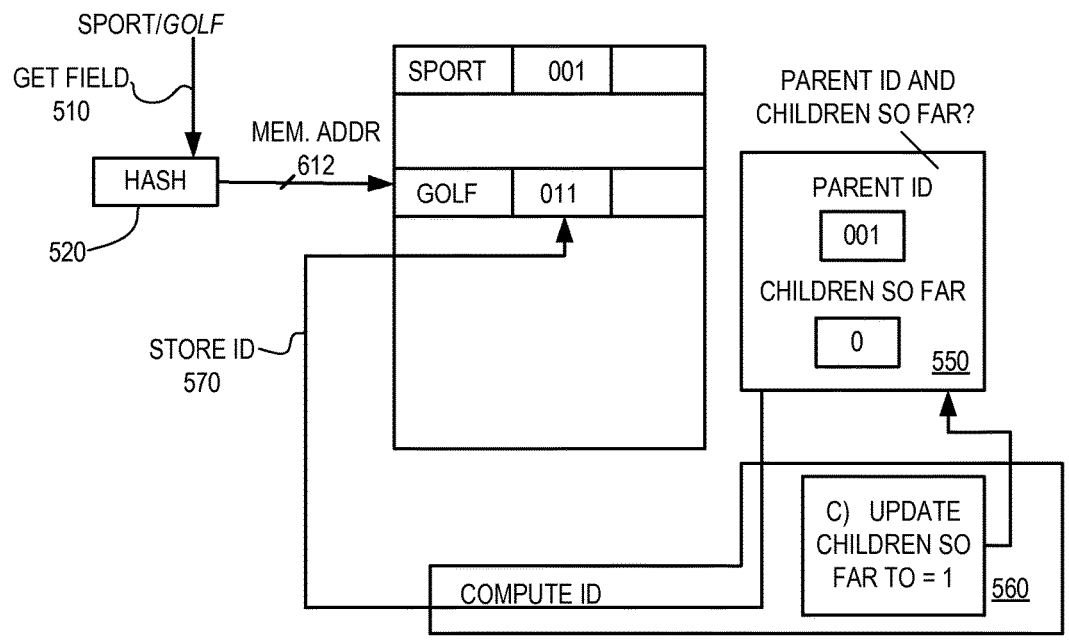
FIG. 6C illustrates creating another entry for the hash table, according to embodiments of the present invention.

FIG. 6C shows getting 510 the second node, that is, "golf," and hashing it 522, which yields a computed memory address 612, which does not already have an entry there. Process 500 reads the parent identifier and the number of children so far for the parent of the current topic at 550. Responsive to obtaining this, process 500 updates the number of children so far, increasing it by one if necessary, and computes 560 an identifier for the current topic. Process 500 stores 570 the topic name "Golf," and identifier "011."

Once the above described initialization is done, the resulting data structure that has been created is ready for speedy access to content for topics in linked list 400. Accessing is done responsive to receiving a request including a text string defining a path of topics such as the example given above, "sport/soccer/arsenal/ranking." First, the received text string for the path is parsed into its component topics, "sport," "soccer," "arsenal" and "ranking," which may be done by a parsing module 207C, which then passes the individual component topics to a retrieval module 207D.

Figure 7:
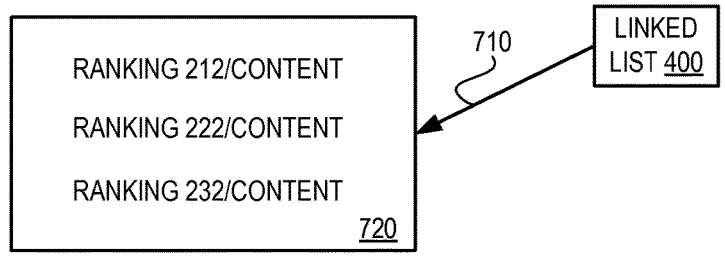
FIG. 7 illustrates a process for retrieval of content from a topic tree by partial matching, according to embodiments of the present invention.

Next, as shown in FIG. 7 according to embodiments of the present invention, retrieval module 207C finds and gets 710 content 720 from the linked list 400 for each node that matches the last component topic of the request's topic path, i.e., the right-most topic in the path, "sport/soccer/arsenal/ranking." This includes getting each matching node's identifier, which initialization module 207A added in linked list 400 before the request was processed by retrieval module 207C.

The matching by retrieval module 207C, as described above, is without regard for which topic in linked list 400 is the child of which parent and may, therefore, be referred to as "partial matching." By retrieving without regard for full matching, module 207C may retrieve all the partial matching content in parallel, i.e., during the same processing cycle or cycles. Thus, in the given example request, retrieval module 207C finds and gets content and respective identifiers "212," "222" and "232" concurrently for each of the three matching instance of "ranking" in a single processing cycle. Alternatively, retrieval module 207C finds and gets the content and respective identifiers at least during the same set of processing cycles. Alternatively, retrieval module 207C finds and gets content and respective identifiers at least during one or more overlapping cycles, wherein at least some of the content for one instance of "ranking," for example, is retrieved during at least one processing cycle when the content for another instance of "ranking" is also concurrently retrieved.

It will be appreciated that in the example two of the "ranking" nodes for which content is retrieved are not the "ranking" node in the "sport/soccer/arsenal/ranking" path that is in the request. Those two are not full matches and will be revealed as false hits by additional processing for full matching. In the additional processing, according to embodiments of the present invention, a matching module 207D looks up node identifiers in hash table 600 for all the component topics in the path defined by the request. See result 810. Then matching module 207D processes 820 the topic names and their node identifiers to find a full match.

Figure 9:
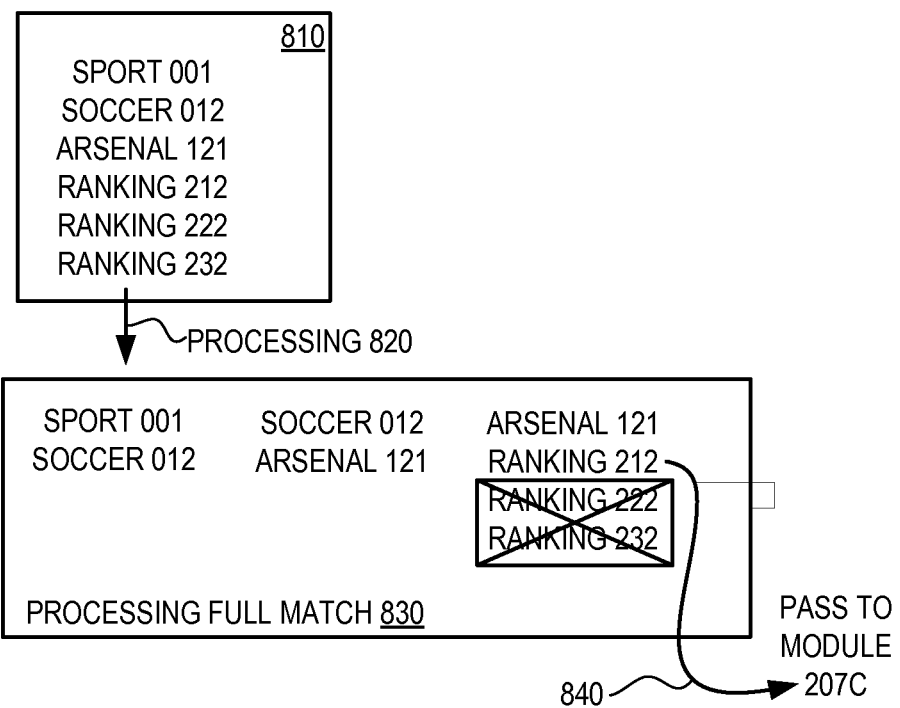
FIG. 9 illustrates a process for matching of content from a topic tree, according to embodiments of the present invention.

More specifically, as shown in FIG. 9 according to embodiments of the present invention, matching module 207D processes 820 the topic names and their node identifiers obtained from the hash table by first finding matches for the instances of node identifiers of the first and second topics in the path of the request, which have a relation of parent-child. In the example request, since "sport" is the first topic in the four-topic request string (parent) that is received, and since "soccer" is the second topic in the string (child), matching module 207D compares the node identifiers of all instances of the text string "sport" that are found in the hash table lookup operation to the node identifiers of all instances of "soccer" that are found. Only child instances that meet certain predefined matching criteria are kept. The criteria are described herein below.

For each kept instance of the second topic in the request string, matching module 207D compares the identifier of each, now as a parent, to the identifier of each instance of the third topic in the received string, which is a child to the second topic. Found instances of the third topic that meet the matching criteria are kept. Matching module 207D iterates this same comparing and retaining of matching topics from one topic of the request to the next, left to right, all the way to the right-most one of the topics, or until no match is found in one of the iterations. If the topic tree indeed has a topic that matches the path defined in the request, process 820 by matching module 207D will proceed successively, via the path specified in the request, from the left-most all the way to the right-most topic in the path to ultimately identify the node identifier of the right-most topic, which fully matches 830 the path. Matching module 207D will then pass 840 the node identifier of the fully matching topic to retrieval module 207C, so that retrieval module 207C can provide the content for this path-matched topic from among the partially matching content retrieved by module 207C.

It should be understood from the above that path matching via hash table 600 by matching module 207D and content retrieval from linked list 400 by retrieval module 207C may be performed independently. According to embodiments of the present invention, the path matching by matching module 207D and the content retrieval by retrieval module 207C may be performed fully or partially concurrently. According to embodiments of the present invention, the content retrieval by retrieval module 207C may even be completed before the path matching by matching module 207D.

Figure 8:
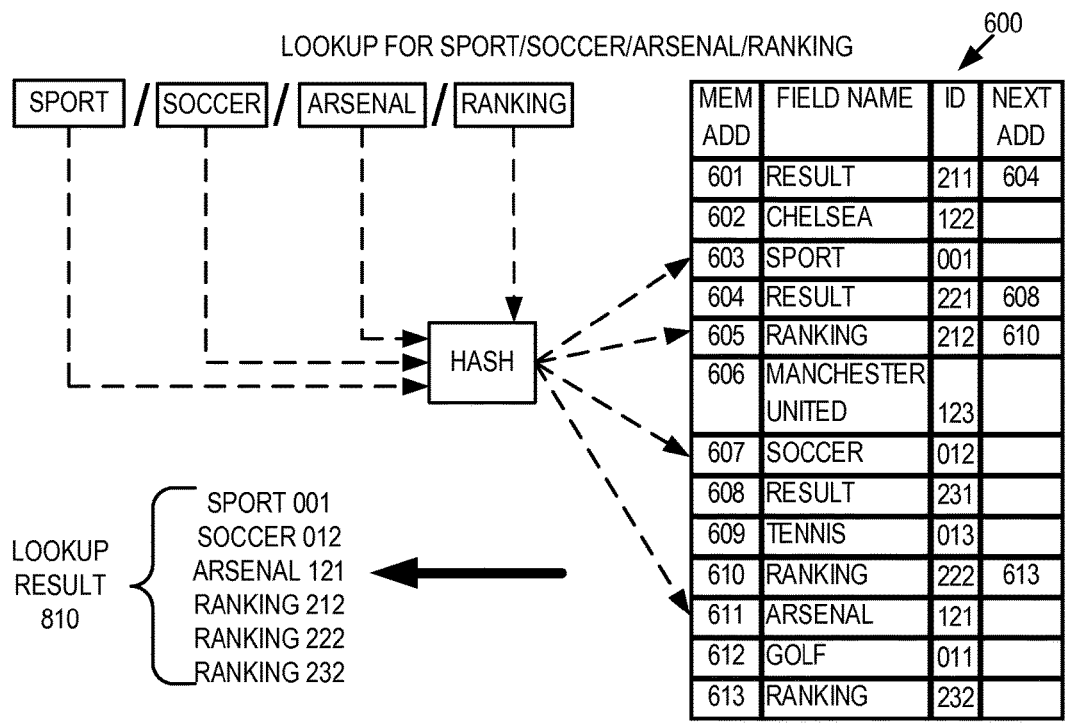
FIG. 8 illustrates a process for full matching of a topic via the hash table of FIG. 6A, according to embodiments of the present invention

Applying the above described full-path matching procedure to the given example, the hash table lookup by matching module 207D returns the node identifiers shown as result 810 in FIG. 8 for the given topics of the request "sport/soccer/arsenal/ranking." In this example, there is just one found instance of "sport" in hash table 600, which has identifier "001," and one found instance of "soccer," which has identifier "012." The request string defines "soccer" as a child of "sport," so matching module 207D compares the two left-most digits "01" of the node identifier "012" of the child topic to the two right-most digits "01" of the node identifier "001" of the parent topic. This yields a match in this case, so matching module 207D keeps the node "soccer 012" for the next processing step.

In the example, for the one instance of the second topic "soccer," which has been kept, matching module 207D compares its node identifier to that of each instance of the third topic in the received string, "arsenal." There is one kept instance of "soccer," which has identifier "012," and one found instance of "arsenal," which has identifier "121." The request string defines "arsenal" as a child of "soccer," so matching module 207D compares the two left-most digits "12" of the node identifier "121" of the child topic "arsenal" to the two right-most digits "12" of the node identifier "012" of the parent topic "soccer." This yields a match in this case, so matching module 207D keeps the node "arsenal 121" for the next processing step.

In the example, for the one instance of the third topic "arsenal," which has been kept, matching module 207D compares its node identifier to that of each instance of the fourth topic in the received string, "ranking." There is one kept instance of "arsenal," which has identifier "121," and three found instances of "arsenal," which has identifiers "212," "222" and "232." The request string defines "ranking" as a child of "arsenal," so matching module 207D first compares the two left-most digits "21" of the node identifier "212" of the first child topic "ranking" found in hash table 600 to the two right-most digits "21" of the node identifier "121" of the parent topic "arsenal." This yields a match in this case, so matching module 207D keeps the node "ranking 212" for the next processing step.

Since there is a second instance of child topic "ranking" found in hash table 600, matching module 207D next compares the two left-most digits "22" of the node identifier "222" of the second child topic "ranking" found in hash table 600 to the two right-most digits "21" of the node identifier "121" of the parent topic "arsenal." This does NOT yield a match in this case, so matching module 207D discards the node "ranking 222" for the next processing step.

Since there is a third instance of child topic "ranking" found in hash table 600, matching module 207D next compares the two left-most digits "23" of the node identifier "232" of the second child topic "ranking" found in hash table 600 to the two right-most digits "21" of the node identifier "121" of the parent topic "arsenal." This again does NOT yield a match in this case, so matching module 207D discards the node "ranking 232" for the next processing step.

Since "ranking" is the last topic in the "sport/soccer/arsenal/ranking" path of the request, matching module 207D passes to retrieval module 207C the matching node identifier "212" found in hash table 600 for this path, according to embodiments of the present invention. (In various embodiments of the present invention, matching module 207D also passes to retrieval module 207C the topic name "ranking" for the matching node identifier "212.") In response to receiving this matching information from matching module 207D, retrieval module 207C sends the content for "ranking 212" to the subscriber from among content that retrieval module 207C got from linked list 400.

To summarize the processing by matching module 207D for the given example, the last two digits of the "sport" node identifier "001" found in hash table 600 match the first two digits of the "soccer" node identifier "012" found therein. The last two digits of the "soccer" node identifier "012" found in hash table 600 match the first two digits of the "arsenal" node identifier "121" found therein. The last two digits of the "arsenal" node identifier "121" found in hash table 600 match the first two digits of only one of the three of the "ranking" node identifier's found therein, i.e., identifier "212," so the other two of the "ranking" node identifiers "222" and "232" are disregarded. Since "ranking" is the last topic in the request path, the one matching "ranking" node identifier "212" is passed to retrieval module 207C, so that module 207C may send the content for this one, fully matching topic to the subscriber.

The depicted examples in FIGS. 1 and 2 and above-described examples are not meant to imply architectural limitations. For example, any of devices 105, 110 and 115 may be a notebook computer, hand held computer, smart phone, kiosk, etc. Further, the present invention may reside on any data storage medium (i.e., floppy disk, compact disk, hard disk, tape, ROM, RAM, etc.) used by a computer system. (The terms "computer," "system," "computer system," and "data processing system" are used interchangeably herein.)

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

One or more databases may be included in a host for storing and providing access to data for the various implementations. One skilled in the art will also appreciate that, for security reasons, any databases, systems, or components of the present invention may include any combination of databases or components at a single location or at multiple locations, wherein each database or system includes any of various suitable security features, such as firewalls, access codes, encryption, de-encryption and the like.

The database may be any type of database, such as relational, hierarchical, object-oriented, and/or the like. A database product that may be used to implement the databases is IBM® DB2®, or other available database products. (IBM and DB2 are trademarks of International Business Machines Corporation, registered in many jurisdictions worldwide.) The database may be organized in any suitable manner, including as data tables or lookup tables.

Association of certain data may be accomplished through any data association technique known and practiced in the art. For example, the association may be accomplished either manually or automatically. Automatic association techniques may include, for example, a database search, a database merge, GREP, AGREP, SQL, and/or the like. The association step may be accomplished by a database merge function, for example, using a key field in each of the manufacturer and retailer data tables. A key field partitions the database according to the high-level class of objects defined by the key field. For example, a certain class may be designated as a key field in both the first data table and the second data table, and the two data tables may then be merged on the basis of the class data in the key field. In this embodiment, the data corresponding to the key field in each of the merged data tables is preferably the same. However, data tables having similar, though not identical, data in the key fields may also be merged by using AGREP, for example.

The host may provide a suitable website or other internet-based graphical user interface accessible by users. In one embodiment, Netscape web server, IBM® Websphere® Internet tools suite, an IBM DB2, universal database platform and a Sybase database platform are used in conjunction with a Sun Solaris operating system platform. (IBM and WebSphere are trademarks of International Business Machines Corporation, registered in many jurisdictions worldwide.) Additionally, components such as JBDC drivers, IBM connection pooling and IBM MQ series connection methods may be used to provide data access to several sources. The term webpage as it is used herein is not meant to limit the type of documents and applications that might be used to interact with the user. For example, a typical website might include, in addition to standard HTML documents, various forms, Java applets, Javascript, active server pages (ASP), Java Server Pages (JSP), common gateway interface scripts (CGI), extensible markup language (XML), dynamic HTML, cascading style sheets (CSS), helper applications, plug-ins, and the like.

While this specification contains many specifics, these should not be construed as limitations on the scope of the invention or of what can be claimed, but rather as descriptions of features specific to particular implementations of the invention. Certain features that are described in this specification in the context of separate implementations can also be implemented in combination in a single implementation. Conversely, various features that are described in the context of a single implementation can also be implemented in multiple implementations separately or in any suitable sub combination. Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

Those skilled in the art having read this disclosure will recognize that changes and modifications may be made to the embodiments without departing from the scope of the present invention.

It should be appreciated that the particular implementations shown and described herein are illustrative of the invention and its best mode and are not intended to otherwise limit the scope of the present invention in any way. Other variations are within the scope of the following claims.

The actions recited in the claims can be performed in a different order and still achieve desirable results. Likewise, the processes depicted in the accompanying figures do not necessarily require the particular order shown, or sequential order, to achieve desirable results. In certain implementations, multitasking and parallel processing can be advantageous.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims.

As used herein, the terms comprises, comprising, or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as essential or critical.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for providing content of a publish-subscribe topic tree, the system comprising:
   a processor; and
   a computer readable storage medium connected to the processor, wherein the computer readable storage medium has stored thereon a program for controlling the processor, and wherein the processor is operative with the program to execute the program for:
      receiving a path for a requested topic, wherein the path specifies topic names leading from highest to lowest level topic names in the path, wherein the topic tree includes topic names and an added node identifier associated with each respective topic name of the topic tree, wherein certain digits of the node identifiers for parent nodes in the tree correspond to certain digits of node identifiers of child node(s) of each respective parent;
      searching a hash table for the topic names specified in the path, wherein the hash table also includes the topic names of the topic tree and includes the node identifier associated with each respective topic name of the topic tree;
      finding, in the hash table, the topic tree node identifiers for the topic names specified in the path;
      designating a highest level topic in the path as a current highest level topic;
      performing parent-child node matching for the node identifiers found in the hash table, including matching certain digits of the found node identifier(s) for the current highest level topic in the path to corresponding digits of the found node identifier(s) for a next lower level topic in the path to find a matching next level node, and then designating a next topic after the current highest level topic in the path to be a new, current highest level topic;
      repeating the parent-child node matching for each successive topic in the path, in order to find the node identifier for the lowest level node in the path; and
      retrieving content in the topic tree only for matching topic names that match the lowest level topic name in the requested topic path independently of whether the matching topic names are on the requested topic path in the tree, including retrieving the content in the topic tree for the matching topic name(s) no later than at least partly in concurrence with the parent-child node matching; and
      sending, for a requestor, the content retrieved for only the one topic name that matches the lowest level topic name in the requested topic path and for which the topic tree node was identified as the lowest level node in the path by the parent-child node matching.

2. The system of claim 1, wherein the retrieving of the content in the tree for matching topics is performed by a computer processor during at least one processing cycle when the finding of the topic tree node identifiers in the hash table is performed.

3. The system of claim 1, wherein the content of at least one of the matching topics is retrieved during at least one processing cycle when at least one other one of the matching topics is retrieved.

4. The system of claim 1, wherein the processor is operative with the program to execute the program for:
   adding node identifiers to nodes of the topic tree.

5. The system of claim 4, wherein the adding of node identifiers to nodes of the topic tree is performed before the retrieving of the content in the topic tree for matching topics.

6. The system of claim 4, wherein the processor is operative with the program to execute the program for:
   creating the hash table, including writing topic names and the node identifiers for respective nodes of the topic tree.

7. A computer program product for providing content of a publish-subscribe topic tree, the computer program product including a computer readable storage medium having instructions stored thereon for execution by a computer system, wherein the instructions, when executed by the computer system, cause the computer system to implement a method comprising:
   receiving a path for a requested topic, wherein the path specifies topic names leading from highest to lowest level topic names in the path, wherein the topic tree includes topic names and an added node identifier associated with each respective topic name of the topic tree, wherein certain digits of the node identifiers for parent nodes in the tree correspond to certain digits of node identifiers of child node(s) of each respective parent;
   searching a hash table for the topic names specified in the path, wherein the hash table also includes the topic names of the topic tree and includes the node identifier associated with each respective topic name of the topic tree;
   finding, in the hash table, the topic tree node identifiers for the topic names specified in the path;
   designating a highest level topic in the path as a current highest level topic;
   performing parent-child node matching for the node identifiers found in the hash table, including matching certain digits of the found node identifier(s) for the current highest level topic in the path to corresponding digits of the found node identifier(s) for a next lower level topic in the path to find a matching next level node, and then designating a next topic after the current highest level topic in the path to be a new, current highest level topic;

repeating the parent-child node matching for each successive topic in the path, in order to find the node identifier for the lowest level node in the path; and retrieving content in the topic tree only for matching topic names that match the lowest level topic name in the requested topic path independently of whether the matching topic names are on the requested topic path in the tree, including retrieving the content in the topic tree for the matching topic name(s) no later than at least partly in concurrence with the parent-child node matching; and sending, for a requestor, the content retrieved for only the one topic name that matches the lowest level topic name in the requested topic path and for which the topic tree node was identified as the lowest level node in the path by the parent-child node matching.

8. The computer program product of claim 7, wherein the retrieving of the content in the tree for matching topics is performed by a computer processor during at least one processing cycle when the finding of the topic tree node identifiers in the hash table is performed.

9. The computer program product of claim 7, wherein the content of at least one of the matching topics is retrieved during at least one processing cycle when at least one other one of the matching topics is retrieved.

10. The computer program product of claim 7, wherein the instructions, when executed by the computer system, cause the computer system to implement a method comprising:

adding node identifiers to nodes of the topic tree.

11. The computer program product of claim 10, wherein the adding of node identifiers to nodes of the topic tree is performed before the retrieving of the content in the topic tree for matching topics.

* * * * *